United States Patent [19]

Cotton

[11] Patent Number: 5,177,479
[45] Date of Patent: Jan. 5, 1993

[54] GARAGE PARKING POSITION INDICATOR

[76] Inventor: John B. Cotton, 724 E. Tennessee, McAlester, Okla. 74501

[21] Appl. No.: 790,948

[22] Filed: Nov. 12, 1991

[51] Int. Cl.$^5$ .............................................. B60Q 1/48
[52] U.S. Cl. .................................. 340/932.2; 340/933
[58] Field of Search ............... 340/932.2, 933, 942, 340/943, 988, 908.1, 928, 435; 180/167, 168, 199, 204; 368/90

[56] References Cited

U.S. PATENT DOCUMENTS

| | | | |
|---|---|---|---|
| 3,395,387 | 7/1968 | Durant | 340/932.2 |
| 3,493,925 | 2/1970 | Brancale | 340/932.2 |
| 3,596,241 | 7/1971 | Migneault | 340/932.2 |
| 3,794,966 | 2/1974 | Platzman | 340/932.2 |
| 3,820,065 | 6/1974 | Koplewicz et al. | 340/932.2 |
| 4,192,394 | 3/1980 | Simpson | 340/933 |
| 4,665,378 | 5/1987 | Heckethorn | 340/932.2 |
| 4,808,997 | 2/1989 | Barkley et al. | 340/932.2 |
| 4,908,617 | 3/1990 | Fuller | 340/932.2 |

Primary Examiner—Jin F. Ng
Assistant Examiner—Brent A. Swarthout
Attorney, Agent, or Firm—Head & Johnson

[57] ABSTRACT

A garage parking position indicator operable on principles of wave energy. A wave energy detector such as an infrared receiver is mounted to one side of the garage access door at a point displaced from the rear wall of the garage by a distance greater than the length of the vehicle. A wave energy source, such as an infrared transmitter, is mounted on the opposite side of the garage access door from the receiver. The transmitter and the receiver are mounted at a height suitable for crosssecting the traveling vehicle from his leading edge to its trailing edge, preferably from bumper to bumper. The transmitter constantly transmits and directs wave energy toward the receiving means so that the presence of any portion of the vehicle between the transmitter and the receiver will interrupt reception of the wave energy by the receiver.

13 Claims, 1 Drawing Sheet

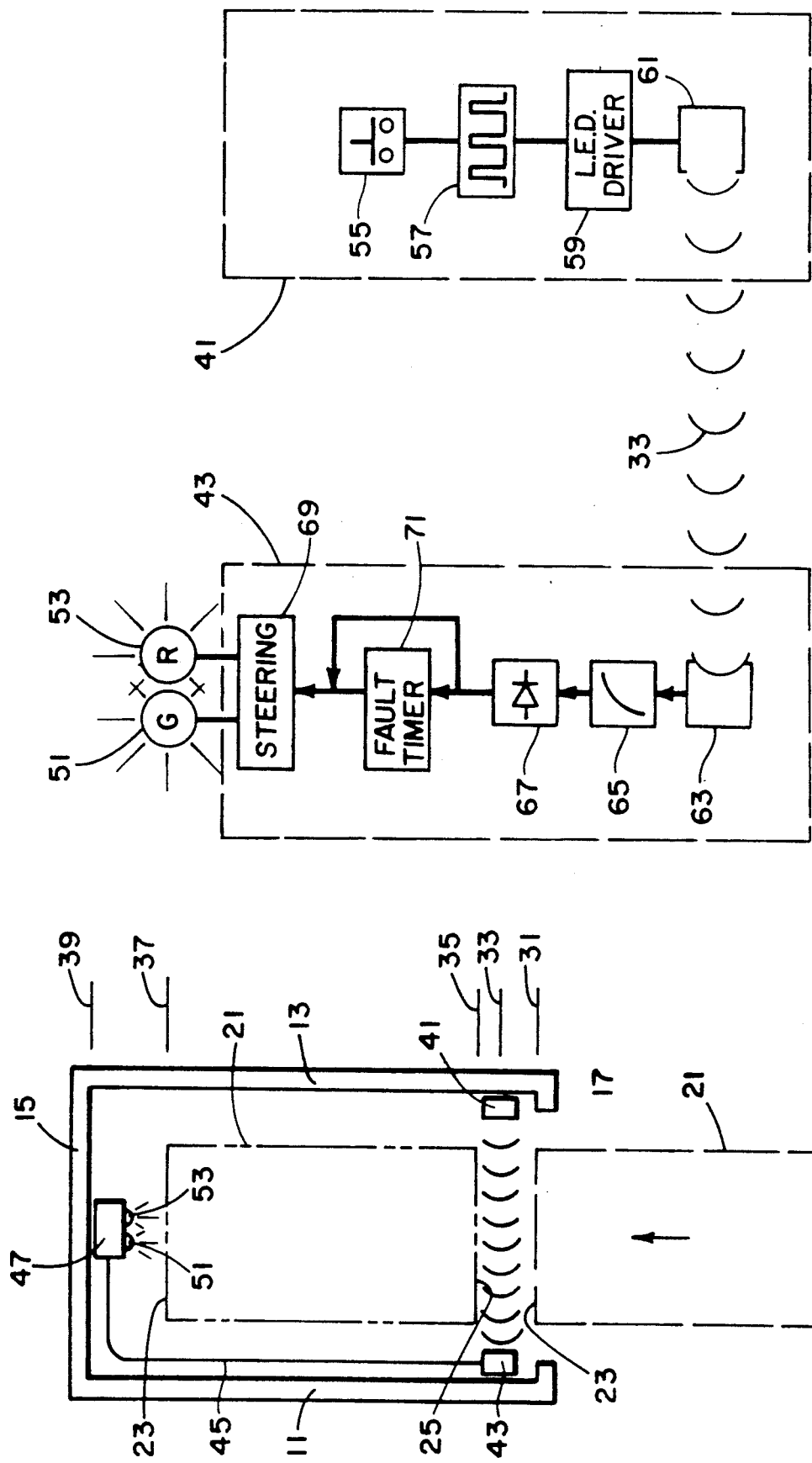

GARAGE PARKING POSITION INDICATOR

BACKGROUND OF THE INVENTION

This invention relates generally to motor vehicle accessories and more particularly concerns a device for assisting a driver to properly position a vehicle in a garage during parking.

While proper positioning of a vehicle in a garage for parking appears at first blush to be a relatively simple maneuver, reflection will probably reveal many instances of difficulty, frustration or worse in accomplishing this task. For example, even in situations involving the rare, uncluttered garage, vehicles may at times be inadvertently permitted to travel until the front bumper makes contact with or even damages the rear wall of the garage. Conversely, in the avoidance of such an occurrence, the vehicle may be stopped while the rear bumper is positioned rearwardly of the plane of the entry door. This in turn prevents closing of the garage door completely. In the case of an automatic garage door, this may cause continued operation of the opener until the problem is recognized. In most garages, goods or equipment stored along the rear wall of the garage tend to complicate the positioning of the vehicle because of reduced parking area, obstructed vision and variations of depth perception. These difficulties take on special significance to elderly drivers who may have difficulty in judging distances under the best of circumstances.

Various mechanical devices, generally operated on a lever principle in which the forward structure of the vehicle flips a control mechanism when the vehicle has advanced to a preselected forward position, have been proposed to solve these problems. In addition, a variety of electrical devices, typically employing a photo cell circuit controller for sensing the forward position of the vehicle, have also been proposed.

The general failing of these mechanical and electrical devices is that, while they can determine the location of the leading edge of the vehicle in the garage, they provide no positional data relative to the location of the rear of the vehicle. As a result, if a driver using a particular garage parking space does not always use a car of the same length, the known devices provide no guarantee whatsoever that the rear edge of the vehicle will be clear of the garage door.

Furthermore, the mechanical devices are caused to operate by the physical force or impact of the vehicle against a control mechanism, and therefore the devices themselves are susceptible to wear and damage. And while the known electrical systems, when properly functioning, generally indicate the stop location for the forward edge of the vehicle, these systems provide no assurance to the driver that the system is actually functioning properly during entry of the vehicle into the garage. Such a system, if it malfunctions, may do more harm than good.

It is, therefore, a primary object of this invention to provide a garage parking position indicator that will indicate the desired positioning of both the forward and rear edges of the vehicle between the rear wall of the garage and the garage door. A further object of this invention is to provide a garage parking position indicator that has a minimal number of moving parts. And it is an object of this invention to provide a garage parking position indicator that confirms to the driver that the system is in proper operation upon entry of the vehicle into the garage.

SUMMARY OF THE INVENTION

In accordance with the invention, a garage parking position indicator operable on principles of wave energy is provided. A wave energy detector such as an infrared receiver is mounted to one side of the garage access door at a point displaced from the rear wall of the garage by a distance greater than the length of the vehicle. A wave energy source, such as an infrared transmitter, is mounted on the opposite side of the garage access door from the receiver. The transmitter and the receiver are mounted at a height suitable for crosssecting the traveling vehicle from its leading edge to its trailing edge, preferably from bumper to bumper. The transmitter constantly transmits and directs wave energy toward the receiving means so that the presence of any portion of the vehicle between the transmitter and the receiver will interrupt reception of the wave energy by the receiver. In a preferred embodiment of the invention, a multiple light signal device is operated in response to the reception of the wave energy. Interruption of the reception by the forward edge of the vehicle causes a green entry signal to be energized and restoration of the reception upon passage of the rear edge of the vehicle through the signal path causes the green entry signal to be de-energized and a red stop signal to be energized. Alternate embodiments employ single light signal devices and/or audible alarms. Operation of the wave transmitter may be automatically initiated in response to the opening of the garage door and a time disconnect may be used to limit the continuous operation of the indicator.

BRIEF DESCRIPTION OF THE DRAWINGS

Other objects and advantages of the invention will become apparent upon reading the following detailed description and upon reference to the drawings in which:

FIG. 1 is a plan view illustrating the positioning and operation of a preferred embodiment of the garage parking position indicator in a typical garage application; and FIG. 2 is a schematic diagram of the garage parking position indicator of FIG. 1.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION

Turning first to FIG. 1, a preferred embodiment of the garage parking position indicator for use in a typical garage is illustrated. The garage consists of left and right garage side walls 11 and 13, a rear wall 15, and a vehicle access door 17. The vehicle 21 to be parked in the garage has leading and trailing edges 23 and 25 and is depicted both in position for entry into the garage and in its final parked position in the garage. Relevant depths in the garage include the access door interior surface 31, the wave energy signal path 33, the rearward parking limit 35, the forward parking limit 37 and the rear wall interior surface 39.

The parking position indicator includes a wave energy transmitter 41 and a wave energy receiver 43 mounted in the garage on opposite sides of the vehicle access door 17 to define a wave energy path 33 which extends transversely to the path of travel of the vehicle 21. Transmitter 41 and receiver 43 may be photoelectric or, preferably of the infrared type. They are located so that the signal path 33 is displaced from the rear wall interior surface 39 by a distance greater than the length of the vehicle 21. The transmitter 41 and receiver 43 are further mounted at a height such that the signal path 33 will cross-sect the traveling vehicle 21 from its leading edge 23 to its trailing edge 25. Typically, this will occur at vehicle bumper height. The receiver 43 is connected by electrical conductors 45 to an indicating device 47, preferably mounted on the rear wall 15 of the garage at approximately eye level in relation to the driver of the vehicle 21. As shown in this preferred embodiment, the indicating device 47 is a multiple light device, preferably including a green entry light 51 and a red stop light 53.

The operation of the parking position indicator can best be understood by further reference to the schematic control diagram of FIG. 2 in reference to the positioning of the vehicle as illustrated in FIG. 1.

The transmission of wave energy by the transmitter 41 is continuous throughout the operation of the device. It may be initiated, however, by a timing switch 55 in the transmitter 41 operated by the opening of the vehicle access door 17 and continuously operate for a preselected period of time determined by the switch 55. When the switch 55 is closed, an oscillator 57 provides a low duty cycle signal through an L.E.D. driver 59 to an infrared L.E.D. 61. The receiver 43 has an infrared detector 63 which receives the light pulse energy from the transmitter 41. The low amplitude pulses are amplified and filtered by a high pass filter 65 having a cut-off just below the pulse amplitude. Thus, only high frequency pulses are passed and signals caused by ambient light are blocked, allowing use of the device in daylight hours. The passed signal is dc converted and detected by a detector circuit 67. With the garage access door 17 in the open condition and the wave energy in continuous transmission from the L.E.D. 61 of the transmitter 41 along the signal path 33 to the receiver 43, as the vehicle 21 enters the garage, its leading edge 23 will pass through the signal path 33 thus interrupting the reception of wave energy by the receiver 43. This interruption of energy reception causes a steering circuit 69 to connect the green light 51 to its power source, energizing the green light 51 and indicating to the driver that the system is in operation and that the vehicle 21 should continue to proceed in its forward travel. As the leading edge 23 of the vehicle 21 approaches or reaches the forward parking limit 37, the trailing edge of the vehicle 21 will pass through the signal path 33 and approach the rearward parking limit 35. As the trailing edge 25 of the vehicle 21 passes through the signal path 33, reception of wave energy by the receiver 43 is restored. Restoration of this energy causes the steering circuit 69 to disconnect the green light 51 from its power source. At the same time, the steering circuit 69 connects to its power source, energizing the red light 53 and indicating to the driver that the trailing edge 25 of the vehicle has cleared the vehicle access door 17 and the vehicle 21 is in appropriate position for parking. After a preselected period of time, the time delay switch 55 interrupts the entire circuit, thereby de-energizing the red light 53. Alternatively, the entire system may be shut down by the closing of the garage access door 17. A fault timer 71 may also be employed which will time out if the infrared beam is blocked for an excessive time period. This will turn off the green light 51 and flash the red light 53, thus indicating a failure in the beam or a blockage in the beam path.

The system may of course operate as a single light system in which the signal light is energized to indicate the proper operation of the system and subsequently de-energized by the restoration of reception of wave energy to signal the appropriate positioning of the vehicle 21. Furthermore, visual indicators other than lights may be utilized or the visual indicators may be supplemented or replaced by audible indicators such as a horn or bell system.

Thus, it is apparent that there has been provided, in accordance with the invention a garage parking position indicator that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. For use in indicating proper positioning of a vehicle travelling along an entry path into a garage for parking between a vehicle access door of the garage and a rear wall of the garage, apparatus comprising:

means for receiving wave energy mountable inwardly of the access door on one side of the entry path at a point displaced from the rear wall by a distance greater than the length of the vehicle and at a height suitable for cross-secting the travelling vehicle from a leading to a trailing edge thereof;

means mountable inwardly of the access door on an opposite side of the entry path from said receiving means for constantly transmitting and directing wave energy toward said receiving means along a path substantially transverse to the vehicle entry path whereby the presence of any portion of the vehicle on said transverse path interrupts reception of said wave energy by said receiving means; and means responsive to interruption of reception of said wave energy by said receiving means for indicating passage of the leading edge of the travelling vehicle across said transverse path and responsive to restoration of reception of said wave energy by said receiving means for indicating passage of the trailing edge of the travelling vehicle across said transverse path.

2. Apparatus according to claim 1, said responsive means comprising an electrically operable audible alarm mountable in the garage and a switching means electrically connectable between said alarm and said receiving means for controlling said alarm, said switching means being actuable in response to interruption of reception of said wave energy to activate said alarm and deactuable in response to restoration of reception of said wave energy to deactivate said alarm.

3. Apparatus according to claim 1, said responsive means comprising an electrically operable visual alarm mountable in a rear portion of the garage and a switching means electrically connectable between said alarm and said receiving means for controlling said alarm, said switching means being actuable in response to interruption of reception of said wave energy to activate said alarm and deactuable in response to restoration of reception of said wave energy to deactivate said alarm.

4. Apparatus according to claim 3, said visual alarm comprising a light.

5. For use in indicating proper positioning of a vehicle travelling along an entry path into a garage for parking between a vehicle access door of the garage and a rear wall of the garage, apparatus comprising:
- means for receiving wave energy mountable inwardly of the access door on one side of the entry path at a point displaced from the rear wall by a distance greater than the length of the vehicle and at a height suitable for cross-secting the travelling vehicle from a leading to a trailing edge thereof;
- means mountable inwardly of the access door on an opposite side of the entry path from said receiving means for constantly transmitting and directing wave energy toward said receiving means along a path substantially transverse to the vehicle entry path whereby the presence of any portion of the vehicle on said transverse path interrupts reception of said wave energy by said receiving means; and
- first and second electric lights mountable in a rear portion of the garage and switching means electrically connectable between said lights and said receiving means for activating said first light in response to interruption of reception of said wave energy and for deactivating said first light and activating said second light in response to restoration of reception of said wave energy.

6. Apparatus according to claim 5 further comprising means for electrically disconnecting said second light a predetermined time after activation thereof.

7. Apparatus according to claim 5, said first light being green and said second light being red.

8. Apparatus according to claim 5, said lights being mountable at approximately eye level of a driver of the vehicle.

9. Apparatus according to claim 1, said transmitting and receiving means being infrared.

10. Apparatus according to claim 9, said transmitter being able to transmit a coded infrared signal distinguishable from ambient infrared signals.

11. Apparatus according to claim 1, said transmitting and receiving means being photoelectric.

12. Apparatus according to claim 1, said receiving means being mountable at approximately the bumper level of the vehicle.

13. For use in indicating proper positioning of a vehicle travelling along an entry path into a garage for parking between a vehicle access door of the garage and a rear wall of the garage, apparatus comprising:
- means for receiving infrared wave energy mountable inwardly of the access door on one side of the entry path at a point displaced from the rear wall by a distance greater than the length of the vehicle and at a height suitable for cross-secting the travelling vehicle from a leading to a trailing edge thereof;
- means mountable inwardly of the access door on an opposite side of the entry path from said receiving means for constantly transmitting and directing coded infrared wave energy toward said receiving means along a path substantially transverse to the vehicle entry path whereby the presence of any portion of the vehicle on said transverse path interrupts reception of said coded wave energy by said receiving means; and
- a green and a red electric light mountable in a rear portion of the garage at approximately eye level of a driver of the vehicle;
- switching means electrically connectable between said lights and said receiving means for activating said green light in response to interruption of reception of said wave energy and for deactivating said green light and activating said red light in response to restoration of reception of said wave energy, and
- means for electrically disconnecting said red light a predetermined time after electrical connection thereof.

* * * * *